(12) United States Patent
Longanbach (10) Patent No.: US 12,210,330 B2
(45) Date of Patent: Jan. 28, 2025

(54) SYSTEMS AND METHODS FOR DETERMINING THICKNESS AND/OR DIAMETER USING COMPUTER VISION

(71) Applicant: Caterpillar Inc., Peoria, IL (US)

(72) Inventor: David Michael Longanbach, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 429 days.

(21) Appl. No.: 17/827,418

(22) Filed: May 27, 2022

(65) Prior Publication Data

US 2023/0384751 A1 Nov. 30, 2023

(51) Int. Cl.
*G05B 19/042* (2006.01)

(52) U.S. Cl.
CPC .. *G05B 19/0428* (2013.01); *G05B 2219/2611* (2013.01)

(58) Field of Classification Search
CPC ........ G05B 19/0428; G05B 2219/2611; G01B 11/03; G01B 3/24
See application file for complete search history.

(56) References Cited

U.S. PATENT DOCUMENTS

| | | | |
|---|---|---|---|
| 2011/0138645 A1* | 6/2011 | Zhang | G01B 7/12 33/784 |
| 2018/0108178 A1* | 4/2018 | Murugappan | G06F 30/00 |
| 2021/0116330 A1 | 4/2021 | Lesesky et al. | |

FOREIGN PATENT DOCUMENTS

| | | | |
|---|---|---|---|
| CN | 101264766 A | | 9/2008 |
| CN | 104197798 | | 12/2014 |
| CN | 210268406 | | 4/2020 |
| CN | 210268406 U | * | 4/2020 |
| EP | 3309504 | | 4/2018 |
| KR | 10-2018-0056534 A | | 5/2018 |
| KR | 20180056534 A | * | 5/2018 |

OTHER PUBLICATIONS

"Use the Measure App on Your IPhone, IPad, or IPod Touch." Apple Support, Apple, Inc., Feb. 22, 2021, https://support.apple.com/en-us/HT208924. (4 pages, in English).

* cited by examiner

*Primary Examiner* — Mohammad Ali
*Assistant Examiner* — Dhruvkumar Patel (57) ABSTRACT

Systems and methods for determining a dimension of a component are disclosed. The method includes receiving one or more images, one or more videos, or a combination thereof of a caliper having a plurality of markers. The one or more images, the one or more videos, or a combination thereof are captured by one or more image sensors of a mobile device. The plurality of markers includes a respective marker on each of a first measuring arm, a second measuring arm, and a pivot point of the caliper. A processing, via one or more processors, of the one or more images, the one or more videos, or a combination thereof of the caliper with the plurality of markers to determine locations of the plurality of markers. A processing, via the one or more processors, of the locations of the plurality of markers to determine a distance between a first tip of the first measuring arm and a second tip of the second measuring arm.

20 Claims, 9 Drawing Sheets

SYSTEMS AND METHODS FOR DETERMINING THICKNESS AND/OR DIAMETER USING COMPUTER VISION

TECHNICAL FIELD

The present disclosure relates generally to systems and methods for determining thickness, and more particularly, to systems and methods for determining caliper measurements using computer vision.

BACKGROUND

Many activities require or benefit from accurate measurement of dimensions such as thickness or diameter. For example, maintenance for a machine may include evaluating an amount of wear on a component of the machine based on a measurement of thickness, e.g., via the use of calipers. Mobile working machines used in construction sites may be subjected to extremely harsh conditions resulting in extreme wear, e.g., scratching and scuffing, of several components, e.g., undercarriage. Operating a worn-out component until it fails often causes failures of other components that are dependent upon the failed component. A failure of a single component may incur higher operating expenses for the overall operation of the machine, hence routine maintenance is important.

Typically, a caliper includes two measuring arms, which are brought into contact with opposite surfaces of component physical structure to be measured. Conventionally, a user measures the distance between the tips of the two measuring arms and manually records the measurement, e.g., by entering the measurement into a system to determine the wear percentage of the component. This process is generally slow, inefficient, and error-prone, especially when the user is on a tight schedule and may not have adequate time to capture the required measurements of the component. For instance, juggling between the calipers, a measurement device, and a recording implement may be difficult and/or time consuming.

A method of measuring an object size by using a laser sensor and a smartphone camera is disclosed in the Korean Patent Application Publication No. KR20180056534A, published on May 29, 2018, to Hyoung et. al ("the '534 publication"). While the method described in the '534 publication may be useful in some circumstances, laser sensors and/or cameras may experience difficulties measuring components with complex specifications and positioned at challenging locations. A high degree of precision is required for such sensor-based measurements, however, laser sensors and/or cameras may not be adapted for accurate measurements of components with intricate designs and are situated at inconvenient locations that result in misalignment with the sensors. Furthermore, the method described in the '534 publication may not resolve the slow, inefficient, and error-prone problem of users having to juggle between the calipers, a measurement device, and a recording implement for accurate measurements of components with complex designs and are situated at inconvenient locations.

The disclosed method and system may solve one or more of the problems set forth above and/or other problems in the art. The scope of the current disclosure, however, is defined by the attached claims, and not by the ability to solve any specific problem.

SUMMARY

In one aspect, an exemplary embodiment of a system for determining a dimension of a component of a machine may include a caliper with a first measuring arm having a first tip and a second measuring arm connected to the first arm via a pivot point, and having a second tip. A plurality of markers that includes a respective marker on each of the first measuring arm, the second measuring arm, and the pivot point. A mobile device including one or more sensors may be configured to capture an image or a video; at least one memory may store instructions; and one or more processors operatively connected with the one or more sensors and the at least one memory, and may be configured to execute the instructions to perform operations, including: capturing, via the one or more sensors, one or more images, one or more videos, or a combination thereof of the caliper with the plurality of markers; processing the one or more images, the one or more videos, or a combination thereof of the caliper with the plurality of markers to determine locations of the plurality of markers; and processing the locations of the plurality of markers to determine a distance between the first tip of the first measuring arm and the second tip of the second measuring arm.

In another aspect, an exemplary embodiment of a computer-implemented method for determining a dimension of a component of a machine may include applying a caliper having a plurality of markers on a first measuring arm, a second measuring arm, and a pivot point to the component to be measured; capturing, via one or more sensors of a mobile device, one or more images, one or more videos, or a combination thereof of the caliper with the plurality of markers; processing, via one or more processors of the mobile device, the one or more images, the one or more videos, or a combination thereof of the caliper with the plurality of markers to determine locations of the plurality of markers; and processing, via the one or more processors of the mobile device, the locations of the plurality of markers to determine a distance between a first tip of the first measuring arm and a second tip of the second measuring arm.

In a further aspect, an exemplary embodiment of a method for determining a dimension of a component may include receiving one or more images, one or more videos, or a combination thereof of a caliper having a plurality of markers, the one or more images, the one or more videos, or a combination thereof captured by one or more image sensors of a mobile device, the plurality of markers including a respective marker on each of a first measuring arm, a second measuring arm, and a pivot point of the caliper; processing, via one or more processors, the one or more images, the one or more videos, or a combination thereof of the caliper with the plurality of markers to determine locations of the plurality of markers; and processing, via the one or more processors, the locations of the plurality of markers to determine a distance between a first tip of the first measuring arm and a second tip of the second measuring arm.

Other features and aspects of this disclosure will be apparent from the following description and the accompanying drawings.

BRIEF DESCRIPTION OF THE DRAWINGS

The accompanying drawings, which are incorporated in and constitute a part of the specification, are illustrative of one or more embodiments and, together with the description, explain the embodiments. The accompanying drawings have not necessarily been drawn to scale. Further, any values or dimensions in the accompanying drawings are for illustration purposes only and may or may not represent actual or preferred values or dimensions. Where applicable, some or all select features may not be illustrated to assist in the description and understanding of underlying features. In some of the drawings, exemplary components or dimensions of components are illustrated as being measured. However, it should be understood that other components or dimensions of components that are not illustrated may also be measured. Any suitable component or dimension thereof may be measured according to the techniques herein.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
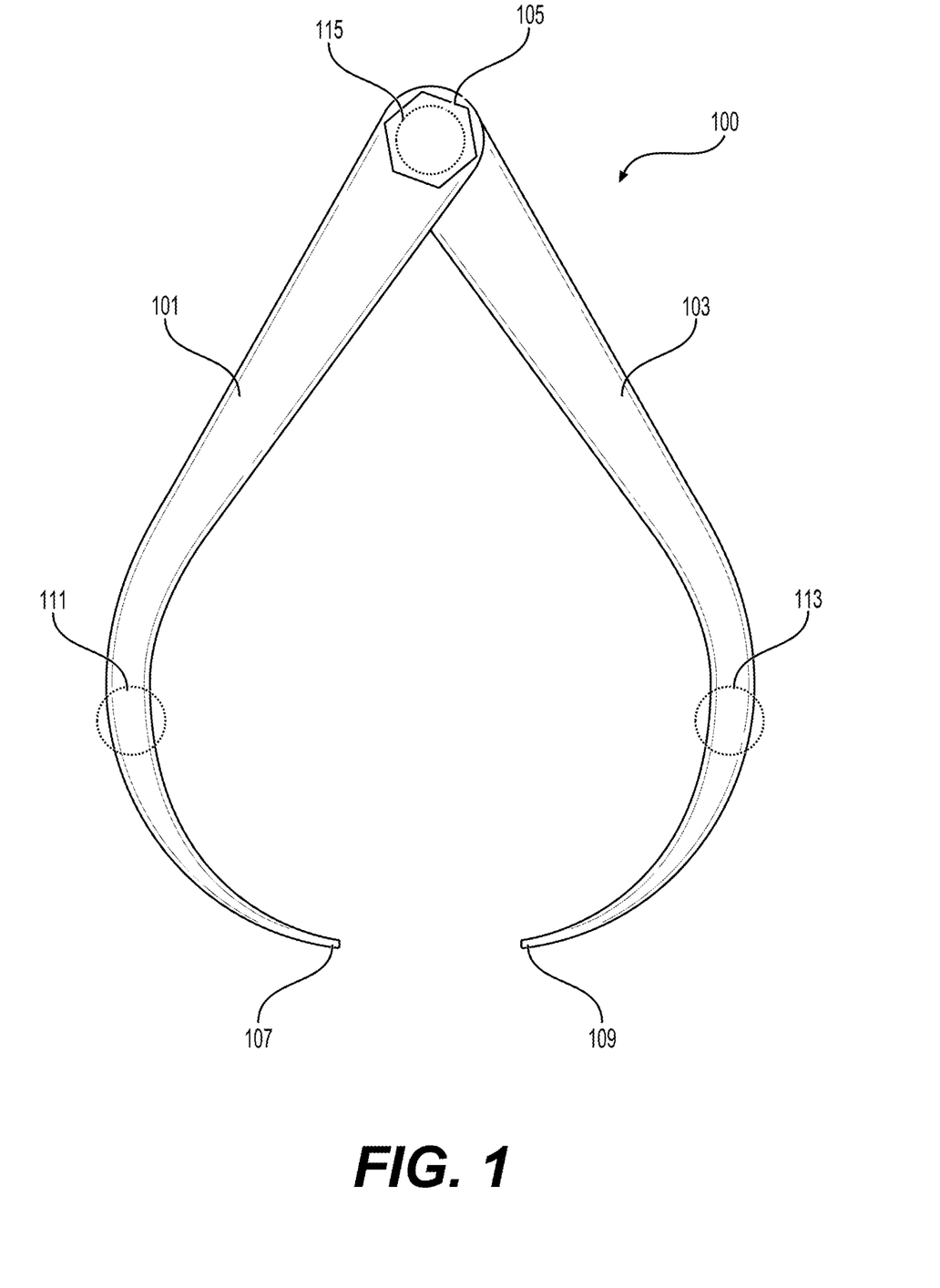
FIG. 1 is a schematic diagram of a caliper, according to aspects of the disclosure.

FIG. 1 is a schematic diagram of a caliper 100, according to aspects of the disclosure. Caliper 100 may include a pair of curved arms 101 and 103, however, it is understood that arms 101 and 103 may include any other shapes as desired. Arms 101 and 103 may be connected near the first end by a joint. In the embodiment illustrated in FIG. 1, the joint is a fastener 105. However, other types of joints are also contemplated, e.g., an integral spring portion, a clip, a support member separately connected to each of the arms 101 and 103, or any other suitable type of joint that defines a pivot point about which the arms 101 and 103 may rotate. Fastener 105 may pass through the holes in arms 101 and 103, respectively, and may define the pivot point. Arms 101 and 103 may have a second free end. The second free end of arms 101 and 103 may comprise pointed tips 107 and 109, respectively. In one instance, pointed tips 107 and 109 may be configured to contact diametrically opposed points on the outside surface of a component, whereby a distance between pointed tips 107 and 109 may indicate an outside dimension of the component such as a diameter. In another instance, pointed tips 107 and 109 may contact surfaces on opposite sides, and the distance between pointed tips 107 and 109 may indicate a thickness of the component. Caliper 100 may be used to measure the inner diameter, outer diameter, thickness, or any other suitable dimension of any suitable components of any suitable machine. It is understood that any other variation of caliper may be used, and indeed any other known features of caliper may be used for calculating the diameter or thickness of the component of a machine.

Caliper 100 may comprise a plurality of markers, e.g., markers 111, 113, and 115 on the surface of arm 101, arm 103, and fastener 105, respectively. While the embodiment in FIG. 1 includes three markers 111, 113, and 115, any suitable number of markers may be used. As discussed in further detail below, at least three markers may be beneficial for using computer vision to determine a measurement of the calipers 100. These markers may be formed on or located at pre-determined locations of caliper 100, however, it is understood that the markers may be formed on any other location of caliper 100. As discussed in further detail below, locations of the markers, respectively on each of the arms 101 and 103, and at the joint/fastener 105 may further facilitate the use of computer vision to determine the measurement of calipers 100. In FIG. 1, the markers are shown to have spherical shapes, however, these markers may be formed in any other shapes as desired. The markers may be formed of rubber, plastic, or any other materials known in the art. In some embodiments, the markers may be at least partially in one piece with the calipers, e.g., the markers may be etched, engraved, and/or embossed on calipers 100. In another embodiment, the markers may include stickers, logos, labels, ink, or any other surface markings that is suitable to be recognized by image sensors of UE 301.

In one instance, these markers may include a plurality of colors. In some embodiments, the plurality of colors may include colors having a high contrast with each other, e.g., black and white or the like. In one instance, the markers may include QR codes, data matrix codes, PDF417 barcodes, Aztec codes, any other two-dimensional barcodes, e.g., a same code for each marker or different codes for one or more of the markers. For instance, the markers 111 and 113 may be the same, and the marker 115 may be different therefrom. As discussed in further detail below, a marker having a plurality of high-contrast colors may further facilitate using computer vision to determine the measurement of the caliper 100.

Figures 2A, 2B:
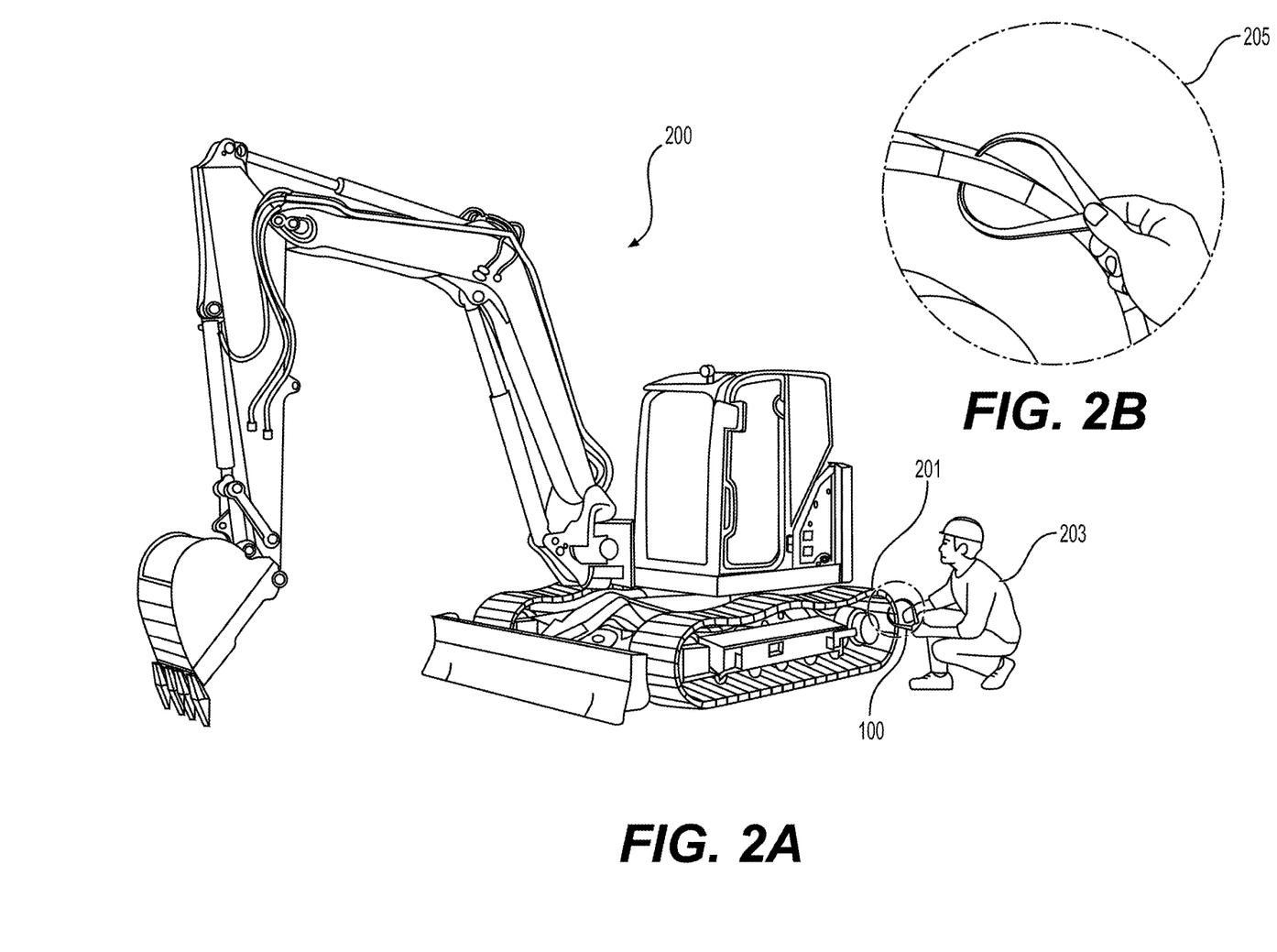
FIG. 2A illustrates a scenario wherein a user measures the thickness of a component machine 200 by using caliper 100 of FIG. 1, according to aspects of the present disclosure.
FIG. 2B illustrates a zoomed view of the measurement of a component using caliper 100, according to aspects of the present disclosure.

FIG. 2A illustrates a scenario in which a user measures the thickness of a component of a machine by using caliper 100, according to aspects of the disclosure. In this example, undercarriage 201 of track-type machine 200 is measured for component wear, however, it is understood that any suitable dimension of any components of any other machines may be measured. These track-type machines 200 may be subjected to harsh conditions which may put extreme wear on undercarriage 201. Any unanticipated component failure of undercarriage 201 may result in a variety of problems, e.g., maintenance operators may not be readily available and the machine may be inoperable until it is repaired, the stalled machine may be in a location that is not easily accessible to perform the required maintenance, the stalled machine may block passageways of other working machines, etc. Accordingly, components of undercarriage 201 require scheduled maintenance. As previously discussed, maintenance may include evaluating the amount of wear on the components of undercarriage 201 by caliper 100. For example, user 203 may use caliper 100 to measure the thickness of a component of undercarriage 201. The relative position of arms 101 and 103 may be adjusted until tips 107 and 109 contacts opposite points on the surface of the component of undercarriage 201. The distance between tips 107 and 109 may indicate the thickness of the component. FIG. 2B depicts a zoomed-in view 205 of the use of the calipers 100 in FIG. 2A to measure the component of the undercarriage 201. In this example, an undercarriage of a track-type machine is measured, however, it is understood that caliper 100 may be used to measure the inner diameter, outer diameter, and thickness of any components of any other machines.

Figure 3:
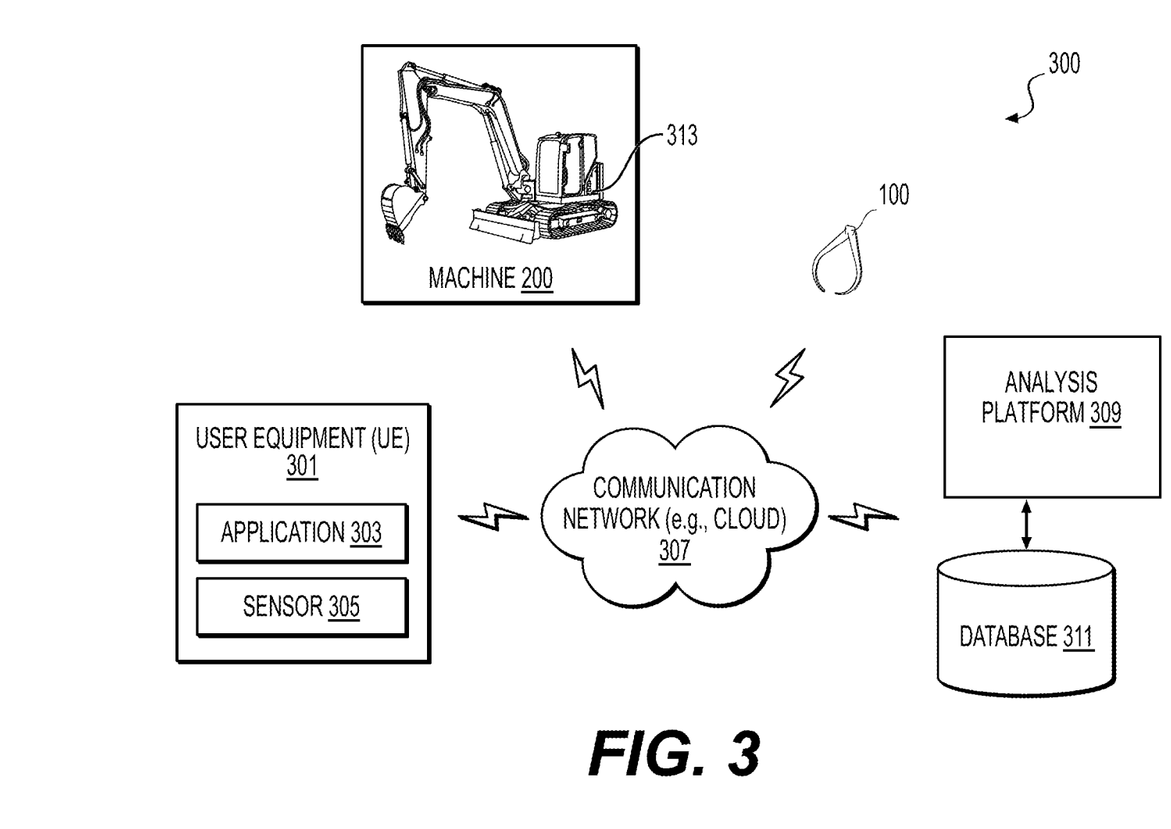
FIG. 3 is a diagram of a system for component wear estimation, according to aspects of the present disclosure.

Referring to FIG. 3, there is shown a schematic view of system 300 for determining various quantities, e.g., the thickness of a component, component wear of machine 200, or the like, according to aspects of the disclosure. System 300 comprises user equipment (UE) 301a-301n (collectively referred to as UE 301), analysis platform 309, and calipers 100. The UE 301 that include or be associated with applications 303a-303n (collectively referred to as applications 303) and sensors 305a-305n (collectively referred to as sensors 305). In one instance, analysis platform 309 has connectivity to machine 200, UE 301, and/or database 311 via communication network 307, e.g., a wireless communication network. In some embodiments, the machine 200 may not be connected to the network 307.

UE 301 may include, but is not restricted to, any type of mobile terminal, wireless terminal, or portable terminal. Examples of UE 301, may include but are not restricted to, a mobile handset, a smartphone, a wireless communication device, a web camera, a laptop, a personal digital assistant (PDA), a unit, a device, a multimedia computer, a multimedia tablet, an Internet node, a communicator, a Personal Communication System (PCS) device, a personal navigation device, a Personal Digital Assistant (PDA), a digital camera/camcorder, an infotainment system, or any combination thereof, including the accessories and peripherals of these devices, or any combination thereof. In addition, UE 301 may facilitate various input means for receiving and generating information, including, but not restricted to, a touch screen capability, keypad data entry, a voice-based input mechanism, and the like. Any known and future implementations of UE 301 may also be applicable.

Application(s) 303 may include various applications such as, but not restricted to, camera/imaging applications, content provisioning applications, networking applications, multimedia applications, location-based applications, media player applications, and the like. In one instance, one of the applications 303 at UE 301 may act as a client for analysis platform 309 and may perform one or more functions of analysis platform 309 by interacting with analysis platform 309 over the communication network 307, e.g., via an Application Programming Interface (API).

The sensor 305 includes an image sensor, e.g., a camera configured to capture image data. By way of example, sensor 305 may further include any other type of sensor. In one instance, the sensors 305 may further include, for example, orientation sensors augmented with height sensors and acceleration sensor to determine the orientation of UE 301, tilt sensors and inclinometer to detect the degree of incline or decline of UE 301, a depth sensor, an audio recorder for gathering audio data, a network detection sensor for detecting wireless signals or receivers for different short-range communications (e.g., Bluetooth, Wi-Fi, Li-Fi, near field communication (NFC), etc.), a global positioning sensor for gathering location data, light sensors, and the like. Any known and future implementations of sensor 305 may also be applicable.

The communication network 307 of system 300 may include one or more networks such as a data network, a wired or wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including 5G (5th Generation), 4G, 3G, 2G, Long Term Evolution (LTE), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one instance, analysis platform 309 may be a platform with multiple interconnected components. Analysis platform 309 may include one or more servers, intelligent networking devices, computing devices, components, and corresponding software for estimating component wear in a machine. In addition, it is noted that analysis platform 309 may be a separate entity of the system 300 or a part of UE 301. Any known or still developing methods, techniques, or processes for estimating component wear in a machine may be employed by analysis platform 309.

In one instance, analysis platform 309 may communicate with control system 313 of machine 200 via communication network 307. Control system 313 may include servers, engine controllers, and sensors that monitor the operation of various components of machine 200. In particular, control system 313 may be configured to sense the operating conditions of machine 200, and, in response to the sensed operating conditions, perform one or more estimations, calculations, modellings, or the like for control of machine 200. Control system 313 may transmit, in real-time, information pertaining to the operating conditions of various components of machine 200 to analysis platform 309.

In one instance, database 311 may be any type of database, such as relational, hierarchical, object-oriented, and/or the like, wherein data are organized in any suitable manner, including as data tables or lookup tables. In one instance, database 311 may store and manage multiple types of information that can provide means for aiding in the content provisioning and sharing process. Database 311 may include a machine-learning based training database with pre-defined mapping defining a relationship between various input parameters and output parameters based on various statistical methods. In one instance, the training database may include machine-learning algorithms to learn mappings between input parameters related to videos or images of the components, the estimated life of a component, estimated time to full wear values, and measurements of various components, e.g., thickness values, wear values, diameter information, etc. In one instance, the training database is routinely updated and/or supplemented based on machine learning methods.

Figure 4:
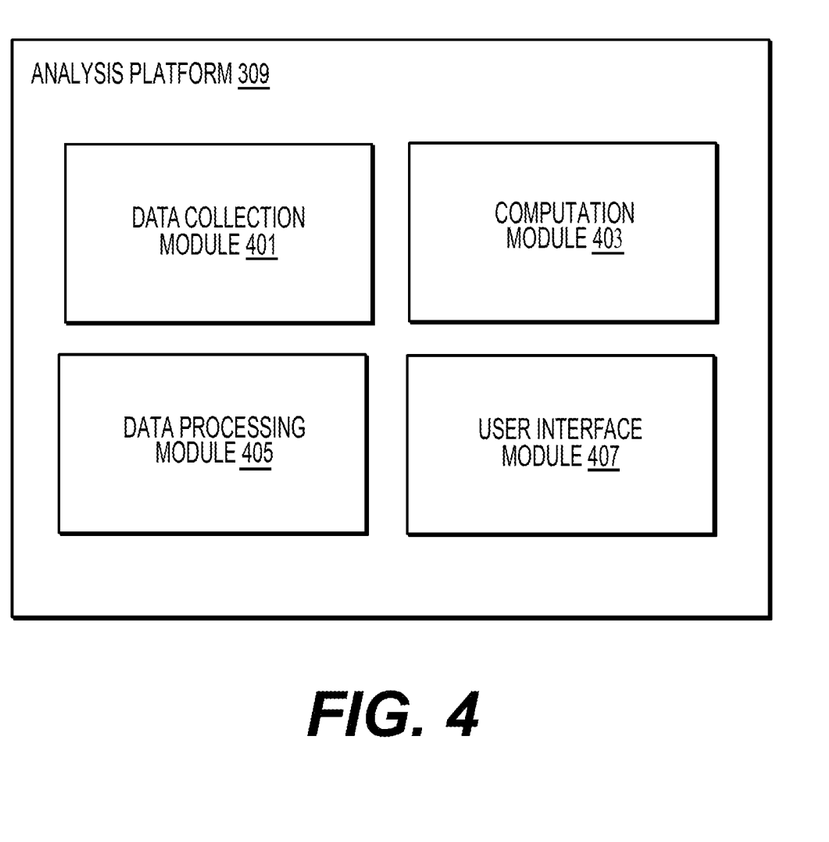
FIG. 4 is a diagram of the components of analysis platform 309, according to aspects of the present disclosure.

FIG. 4 is a diagram of the components of analysis platform 309, according to one example embodiment. As used herein, terms such as "component" or "module" generally encompass hardware and/or software, e.g., that a processor or the like may use to implement associated functionality. By way of example, analysis platform 309 includes one or more components for determining various quantities, e.g., a thickness of a component, component wear in a machine, etc. It is contemplated that the functions of these components may be combined in one or more components or performed by other components of equivalent functionality. In one instance, analysis platform 309 comprises data collection module 401, computation module 403, data processing module 405, and user interface module 407, or any combination thereof.

In one instance, data collection module 401 may collect, e.g., in near real-time or in real-time, videos or one or more images of caliper 100 from sensor 305, e.g., image sensors, cameras, etc., of UE 301. In another instance, data collection module 401 may collect, e.g., in real-time or near real-time, relevant data, e.g., machine-specific information, measurement information of various components of the machines, operating ranges, maintenance data of various components of the machines, safety threshold levels, etc., through various data collection techniques. For example, data collection module 401 may use a web-crawling component to access various databases or other information sources to collect the relevant data pertaining to the various components of the machine. In another instance, data collection module 401 may include various software applications, e.g., data mining applications in Extended Meta Language (XML), that automatically search for and return relevant data regarding various components of the machines. In one instance, data collection module 401 may parse and arrange the data into a common format that can be easily processed by other modules and platforms.

In one instance, computation module 403 may receive, in real-time or near real-time, videos or a plurality of images of caliper 100 from data collection module 401 and may perform computer vision processing of the videos or the plurality of images of caliper 100 to identify the locations of the markers. In another instance, computation module 403 may receive previously captured image or video data. Computation module 403 may calculate the distance between the tips of a caliper based on predetermined information regarding the caliper and on the received data. For example, the computation module 403 may determine the distance based, at least in part, on the pre-determined distance between the plurality of markers on the caliper, the angles formed by the measuring arms of the caliper, a plurality of arcs formed in-between the pre-determined distance, or a combination thereof. In another instance, computation module 403 may calculate the wear life of a component by tracking, in real-time, the usage data of the component when the machine is in operation, maintenance data of the component, the calculated distance between the tips of the caliper, or a combination thereof. In another instance, computation module 403 may calculate the wear percentage of the component by comparing the calculated distance between the tips of the caliper and the calculated wear life of a component. In a further instance, computation module 403 may determine a minimum thickness threshold, safety threshold, minimum wear percentage threshold, or a combination thereof to indicate the operability of a component.

Data processing module 405 may process data collected by data collection module 401. In one instance, data processing module 405 may receive a caliper-based measurement of the component of machine 200 from computation module 403, and may compare the caliper-based measurement with the reference measurements stored in database 311 to determine a change in a dimension of the component, e.g., the wear percentage of the component. Reference measurements may include, but are not limited to, original measurement information of the one or more components, past measurement information of the one or more components, the minimum required measurements of the one or more components, or a combination thereof. In another instance, data processing module 405 may process the usage amount of the measured component of machine 200 to determine whether the usage exceeds a threshold percentage of the estimated life of the component. In another instance, data processing module 405 may process maintenance data of the measured component of machine 200 to determine whether the condition of the measured component is below the safety threshold, below a predetermined operating threshold, or the like.

In one instance, user interface module 407 may enable a presentation of a graphical user interface (GUI) in UE 301. User interface module 407 may employ various APIs or other function calls corresponding to the applications on UE 301, thus enabling the display of graphics primitives such as icons, menus, buttons, data entry fields, etc., for generating the user interface elements. In one instance, user interface module 407 may include data access interface configured to allow users to access, configure, modify, store, and/or download information to a UE 301 or any other type of data device. For example, users may modify operational parameters, operating ranges, or safety threshold levels associated with one or more component configurations, stored in database 311. In another instance, user interface module 407 may cause interfacing of the guidance information with the users to include, at least in part, one or more annotations, text messages, audio messages, video messages, or a combination thereof. For example, user interface module 407 may present an audio/visual in the interface of UE 301 to depict, for example, a measured thickness, metadata associated with the measurement, and/or other data determined by the processing module 405 such as, for example, when the thickness of the measured component of an engine does not meet an operating criterion or threshold.

The above presented modules and components of analysis platform 309 may be implemented in hardware, firmware, software, or a combination thereof. Though depicted as a separate entity in FIG. 3, it is contemplated that analysis platform 309 may be implemented for direct operation by respective UE 301. As such, analysis platform 309 may generate direct signal inputs by way of the operating system of the UE 301. In another embodiment, one or more of the modules 401-407 may be implemented for operation by respective UEs, as analysis platform 309, or a combination thereof. The various executions presented herein contemplate any and all arrangements and models.

Figure 5:
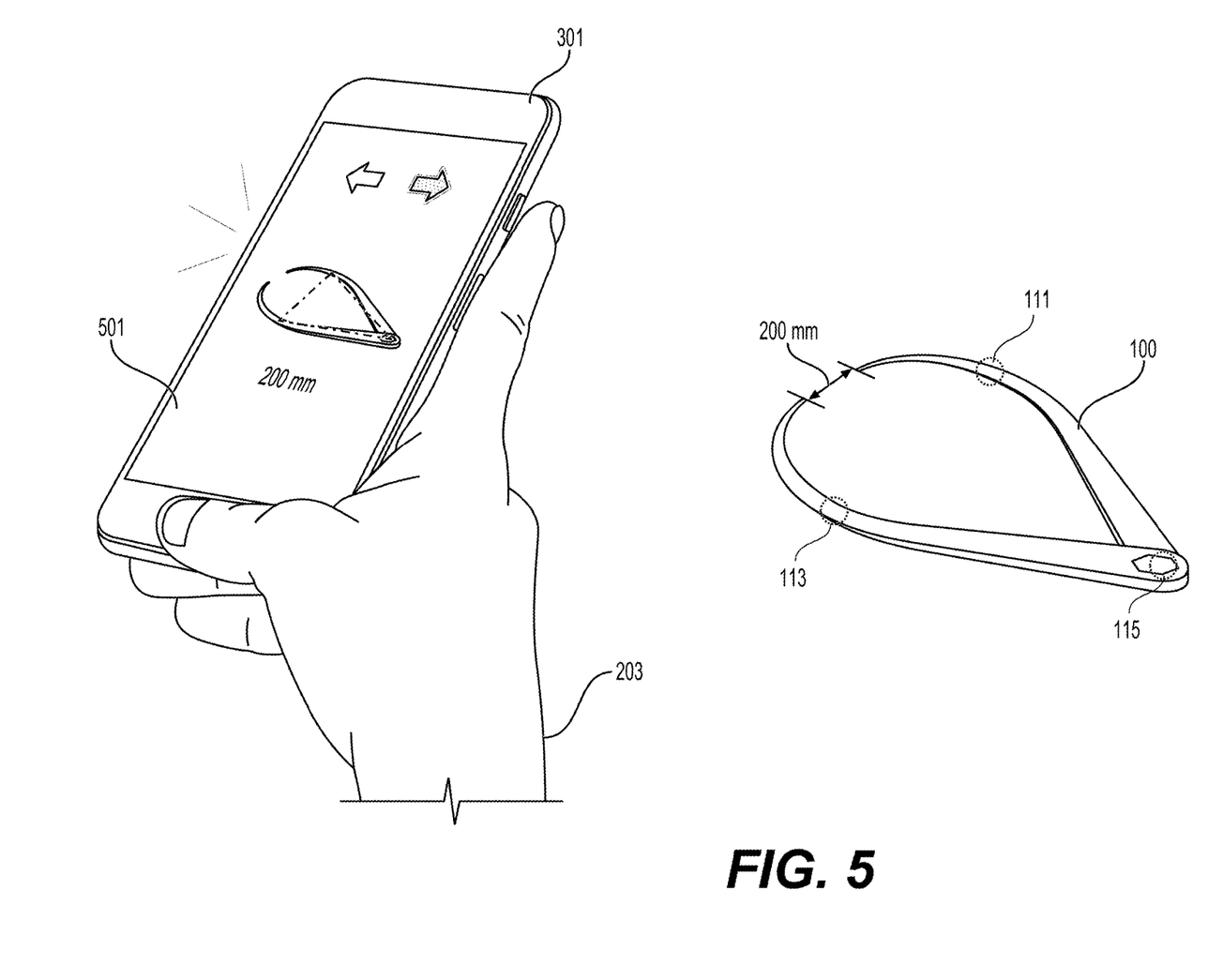
FIG. 5 is a diagram that illustrates a user device capturing, e.g., via an image sensor in real-time or near real-time, a video or images of a measurement device for calculating measurements, according to aspects of the present disclosure.

FIG. 5 is a diagram that depicts a user device capturing a video or an image of a measuring device for calculating measurements, e.g., the calipers 100 of FIG. 1, according to aspects of the present disclosure. As depicted in FIG. 5, user 203 holds the camera of UE 301 towards calipers 100 that have been used to measure a component of machine 200. Analysis platform 309 may generate an audio/video notification in user interface 501 of UE 301 to guide user 203 through the process of capturing a video or a plurality of images of calipers 100. Such notification may be based on various sensor-based measurements, e.g., orientation sensors augmented with height sensors to determine the orientation of UE 301, tilt sensors and inclinometer to detect the degree of incline or decline of UE 301, etc. Analysis platform 309, via sensors 305, may detect the location of the markers on calipers 100 and obtain the known distance between these markers. Analysis platform 309, via sensors 305, may also detect the angles formed by the measuring arms of calipers 100, and/or a measurement of the calipers 100, e.g., the distance between tips 107 and 109.

Figure 6:
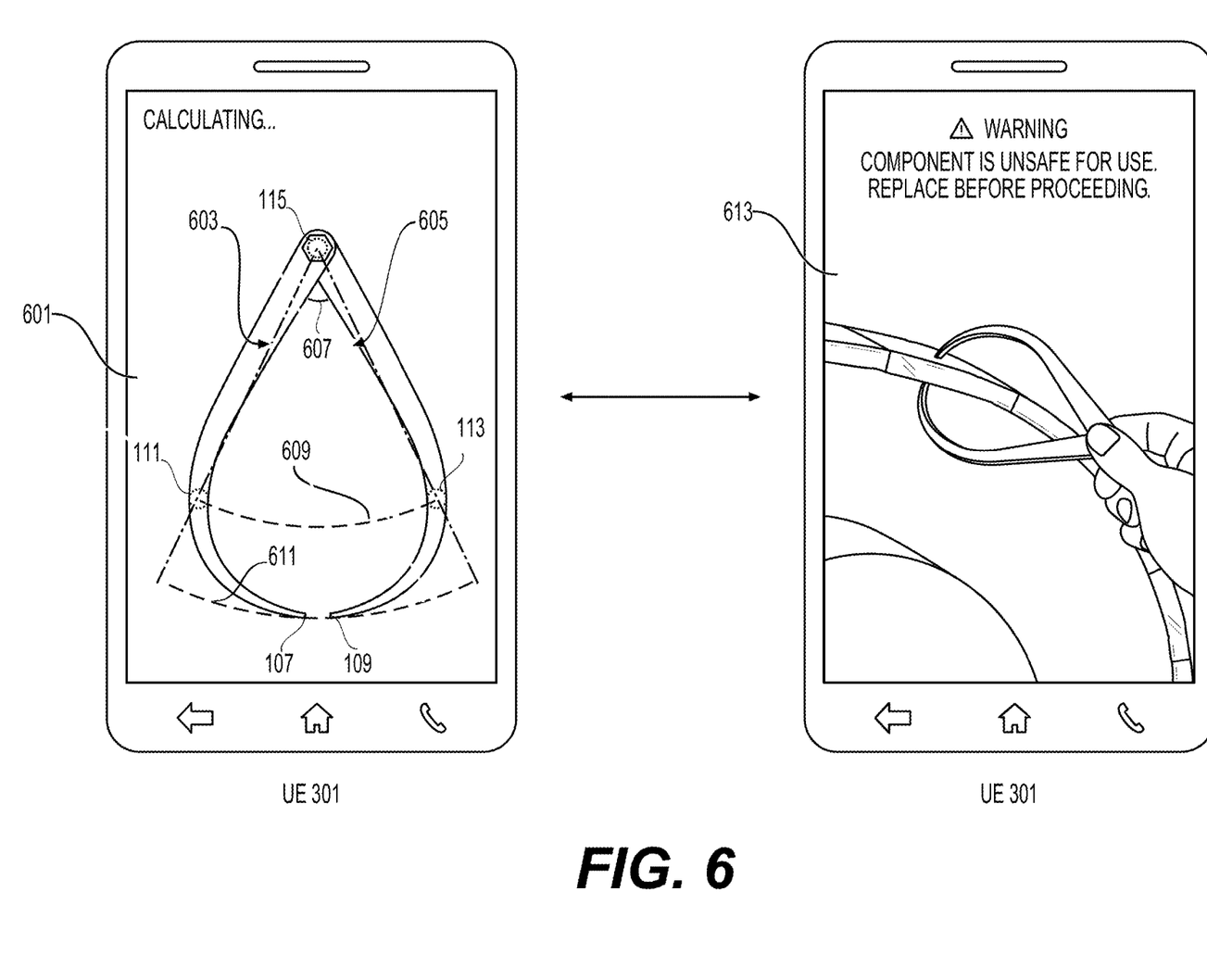
FIG. 6 is a diagram of an exemplary model for calculating the distance between the tips of a measurement device, according to aspects of the present disclosure.

FIG. 6 is a diagram of an exemplary GUI for calculating a distance between the tips of calipers 100, according to aspects of the present disclosure. In one instance, computation module 403 may implement one or more computer vision algorithms, machine learning algorithms, and/or deep learning algorithms to process and analyze the videos and/or images captured by sensor 305 of UE 301. Computation module 403 may perform object identification by processing the captured videos and/or images to identify one or more objects, e.g., markers on caliper 100. The processing may include, for instance, using the computer vision algorithms or equivalent to recognize pixels corresponding to the objects in the captured videos and/or images. Computation module 403 may perform object classification by parsing the visual content and classifying the identified objects into pre-defined categories, e.g., pre-determined location of the markers. Computation module 403 may also process, e.g., in real-time or near real-time, the videos and/or sequences of images to track their movement, e.g., movements of caliper 100. Analysis platform 309 may perform calculations in accordance with various equations without any limitation. As depicted in user interface 601, analysis platform 309 may obtain known distance 603 and 605 from markers 111, 113, and 115. Analysis platform 309 may also obtain angle 607 formed by the measuring arms 101 and 103 at the pivot point. Analysis platform 309 may then calculate the distance for arc 609 and 611 based, at least in part, on the obtained distance and angle. For example, the known distances 603 and 605 may be used, e.g., in conjunction with locations or relative locations of the markers determined via computer vision, to determine a three-dimensional configuration of the calipers 100 and/or three-dimensional locations of the markers relative to each other. Such three-dimensional locations may be used to determine other aspects of the caliper 100, e.g., the angle of the arms 101 and 103, the distance between the tips 107 and 109, an arc between markers 111 and 113, or the like. FIG. 6 shows arcs 609 and 611, however, it is understood that a plurality of arcs may be formed in-between distance 603 and 605 as desired. The measurement of arc 609 and 611 may be utilized to calculate the distance between tips 107 and 109. In various embodiments, any suitable calculations, equations, or three-dimensional modelling or positioning may be used.

In one instance, analysis platform 309 may compare the distance between tips 107 and 109 to reference measurements stored in database 311, e.g., to determine the wear percentage of the component. In another instance, analysis platform 309 may compare the wear percentage of the component to an operating criterion, a safety threshold level, minimum thickness threshold, threshold percentage of the estimated life of the component, or a combination thereof. Analysis platform 309 may determine the component is unsafe based, at least in part, on the comparisons. An aural/video notification may be generated, via user interface module 407, in UE 301, e.g., user interface 613, to alert the user that the measured component of machine 200 is unsafe and needs to be replaced. In one instance, the notification may include data describing information relating to the measurement, e.g., the wear condition of the component, e.g., reduced thickness information, wear percentage, the usage amount of the component as a percentage of its total estimated life, an estimate of remaining operating life, whether the component should be removed from use, etc.

Figure 7:
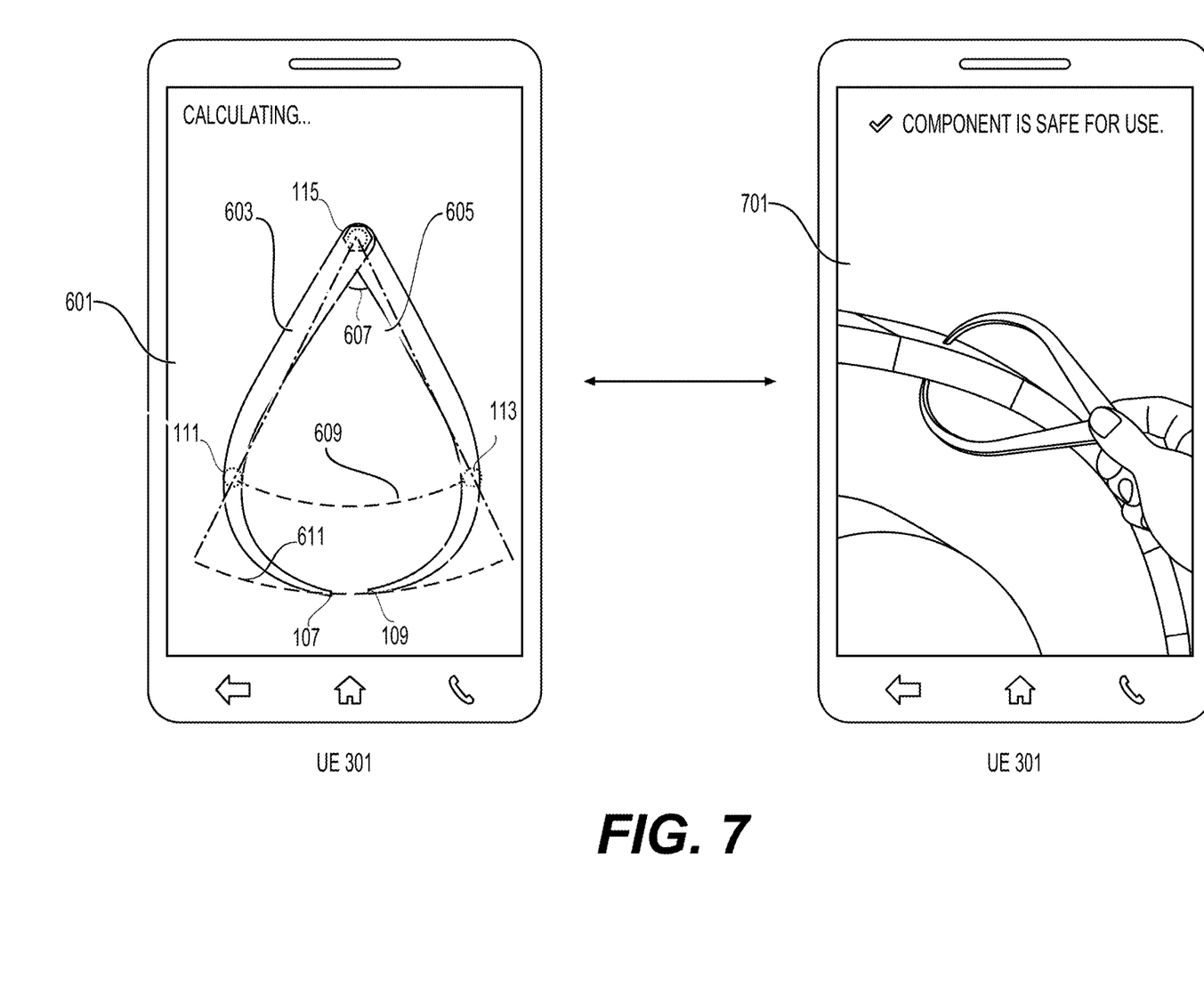
FIG. 7 is a user interface diagram wherein a user is notified on the operability of a component of a machine based on measurement information, according to aspects of the present disclosure.

In one instance, analysis platform 309 may determine the component is approved for use based, at least in part, on the comparisons. For example, the measurement of the components satisfies the reference measurements, the threshold requirements, or a combination thereof. As depicted in FIG. 7, an aural/video notification may be generated, via user interface module 407, in UE 301, e.g., user interface 701, to alert the user that the measured component of machine 200 is safe for usage. The notification may include data describing the maintenance status of the component, current usage amount, a percentage of the estimated life remaining, etc.

Figure 8:
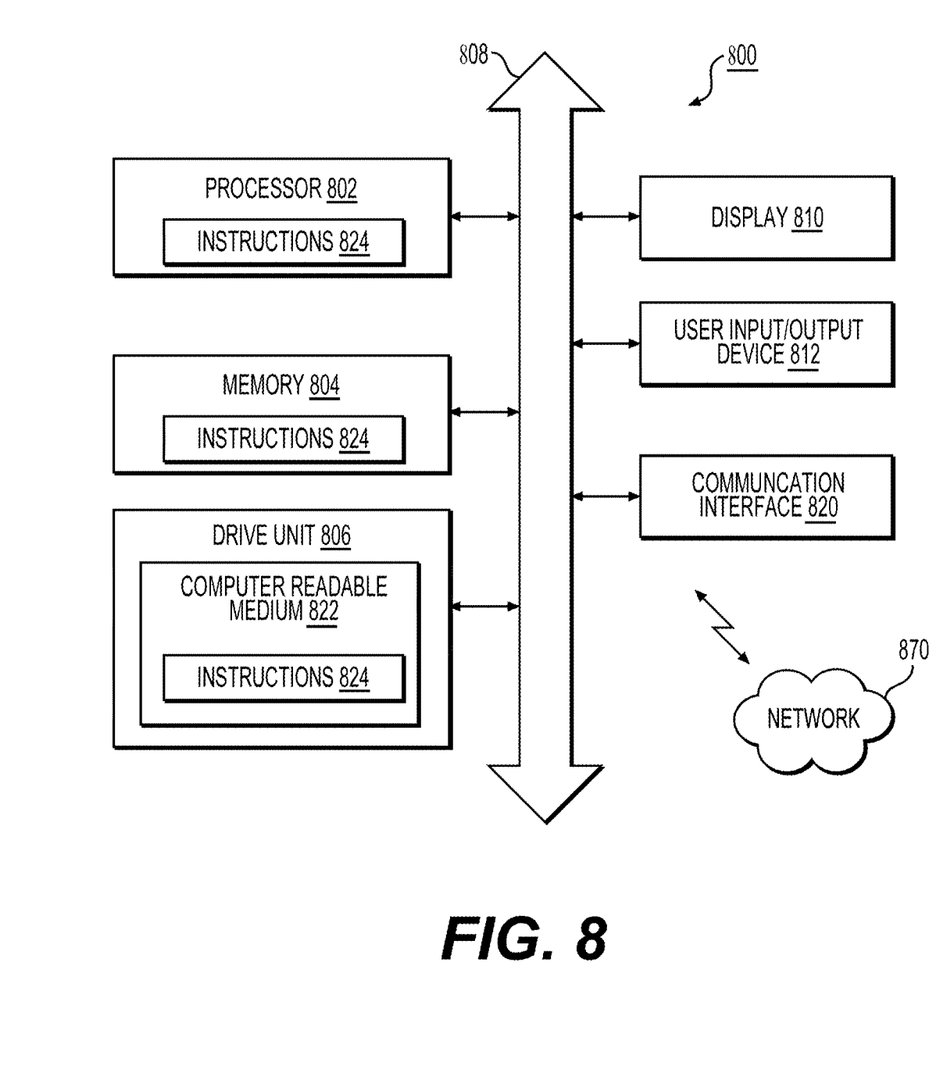
FIG. 8 is a flowchart of a process for determining a distance between the tips of the measuring arms of caliper 100, according to aspects of the present disclosure.

In various embodiments, one or more portions of the methods or techniques disclosed herein may be implemented in, for instance, a chip set including a processor and a memory as shown in FIG. 8. FIG. 8 illustrates an implementation of a general computer system that may execute techniques presented herein. The computer system 800 can include a set of instructions that can be executed to cause the computer system 800 to perform any one or more of the methods, system, or computer based functions disclosed herein. The computer system 800 may operate as a stand-alone device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a land-line telephone, a control system, a camera, a scanner, a facsimile machine, a personal trusted device, a web appliance, a network router, switch or bridge, or any other machine capable of executing a set of instructions (sequential or otherwise) that specify actions to be taken by that machine. In a particular implementation, the computer system 800 can be implemented using electronic devices that provide voice, video, or data communication. Further, while a computer system 800 is illustrated as a single system, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 804 includes a cache or random-access memory for the processor 802. In alternative implementations, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein may be performed by the processor 802 executing the instructions stored in the memory 804. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 800 may further include a display 810, such as a liquid crystal display (LCD), an organic light emitting diode (OLED), a flat panel display, a solid-state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 806.

Additionally or alternatively, the computer system 800 may include an input/output device 812 configured to allow a user to interact with any of the components of computer system 800. The input/output device 812 may be a number pad, a keyboard, or a cursor control device, such as a mouse, or a joystick, touch screen display, remote control, or any other device operative to interact with the computer system 800.

The computer system 800 may also or alternatively include drive unit 806 implemented as a disk or optical drive. The drive unit 806 may include a computer-readable medium 822 in which one or more sets of instructions 824, e.g. software, can be embedded. Further, instructions 824 may embody one or more of the methods or logic as described herein. The instructions 824 may reside completely or partially within the memory 804 and/or within the processor 802 during execution by the computer system 800. The memory 804 and the processor 802 also may include computer-readable media as discussed above.

In some systems, a computer-readable medium 822 includes instructions 824 or receives and executes instructions 824 responsive to a propagated signal so that a device connected to a network 870 can communicate voice, video, audio, images, or any other data over the network 870. Further, the instructions 824 may be transmitted or received over the network 870 via a communication port or interface 820, and/or using a bus 808. The communication port or interface 820 may be a part of the processor 802 or may be a separate component. The communication port or interface 820 may be created in software or may be a physical connection in hardware. The communication port or interface 820 may be configured to connect with a network 870, external media, the display 810, or any other components in computer system 800, or combinations thereof. The connection with the network 870 may be a physical connection, such as a wired Ethernet connection or may be established wirelessly as discussed below. Likewise, the additional connections with other components of the computer system 800 may be physical connections or may be established wirelessly. The network 870 may alternatively be directly connected to a bus 808.

While the computer-readable medium 822 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 822 may be non-transitory, and may be tangible.

The computer-readable medium 822 can include a solid-state memory such as a memory card or other package that houses one or more non-volatile read-only memories. The computer-readable medium 822 can be a random-access memory or other volatile re-writable memory. Additionally or alternatively, the computer-readable medium 822 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 800 may be connected to a network 870. The network 870 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 870 may include wide area networks (WAN), such as the Internet, local area networks (LAN), campus area networks, metropolitan area networks, a direct connection such as through a Universal Serial Bus (USB) port, or any other networks that may allow for data communication. The network 870 may be configured to couple one computing device to another computing device to enable communication of data between the devices. The network 870 may generally be enabled to employ any form of machine-readable media for communicating information from one device to another. The network 870 may include communication methods by which information may travel between computing devices. The network 870 may be divided into sub-networks. The sub-networks may allow access to all of the other components connected thereto or the sub-networks may restrict access between the components. The network 870 may be regarded as a public or private network connection and may include, for example, a virtual private network or an encryption or other security mechanism employed over the public Internet, or the like.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

INDUSTRIAL APPLICABILITY

The disclosed method for determining the thickness and/or wear of a component may be used on any suitable machines subjected to various forms of wear and/or damage. A user may use calipers with markers to measure the thicknesses and/or diameters of a component of a machine. Analysis platform 309 may process, in real-time or near real-time, the videos or one or more images of the caliper, via computer vision techniques, to identify the markers and their locations, and calculate the distance between the tips of the measuring arms of the caliper. The disclosed method for determining the thickness, diameter, and/or characteristics of a component associated with the measurement may find particular applicability in machines operating in industries including construction, mining, farming, etc. Non-limiting examples of machines may include commercial machines, such as trucks, cranes, earth moving vehicles, mining vehicles, wheel loaders, backhoes, motor graders, track-type tractors, hydraulic excavators, track-type loaders, material handling equipment, farming equipment, and other types of movable machines.

Figure 9:
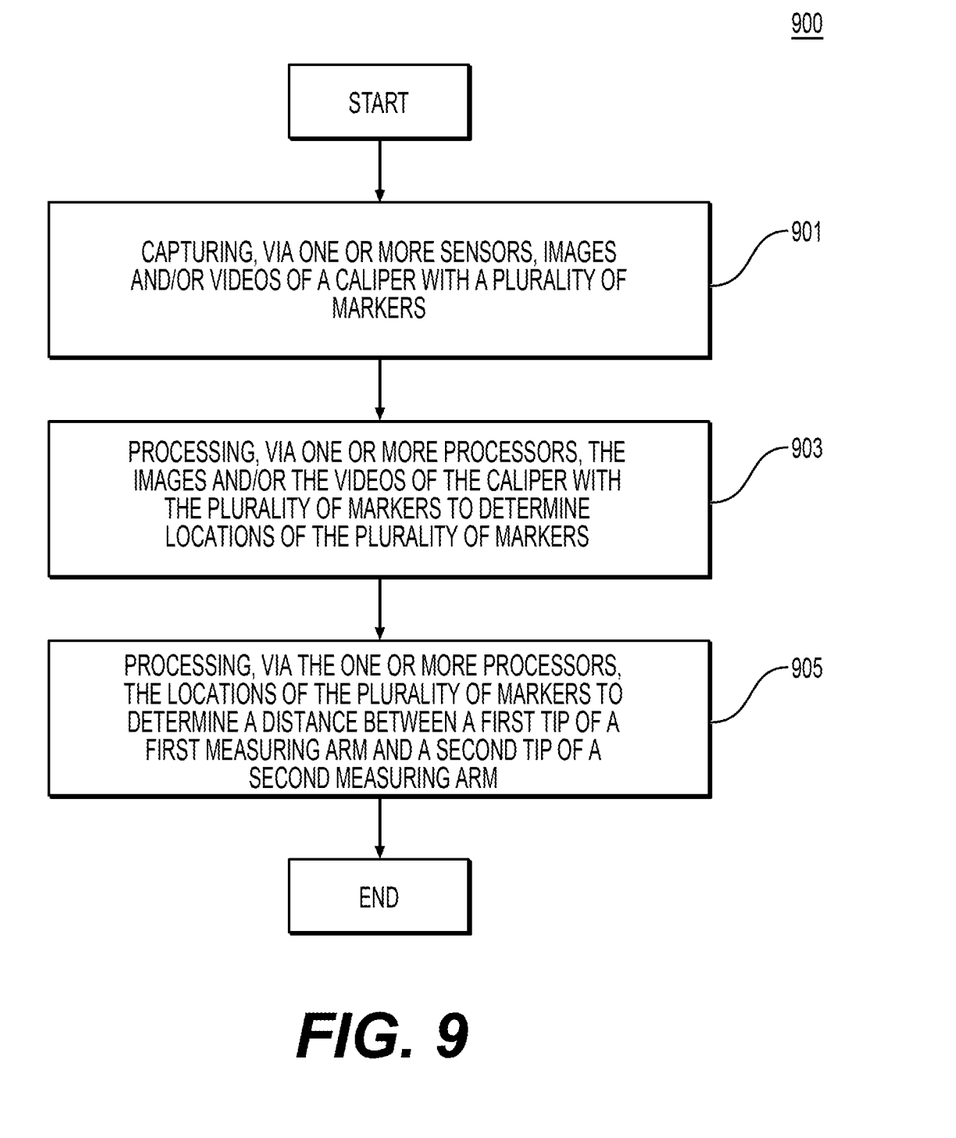
FIG. 9 illustrates an implementation of a general computer system that may execute techniques presented herein.

FIG. 9 is a flowchart of a process for determining a distance between the tips of the measuring arms of a caliper, according to aspects of the present disclosure. In various embodiments, analysis platform 309 and/or any of modules 401-407 may perform one or more portions of process 900 and may be implemented in, for instance, a chip set including a processor and a memory as shown in FIG. 8. As such, analysis platform 309 and/or any of modules 401-407 may provide means for accomplishing various parts of process 900, as well as means for accomplishing embodiments of other processes described herein in conjunction with other components of system 300. Although process 900 is illustrated and described as a sequence of steps, it is contemplated that various embodiments of process 900 may be performed in any order or combination and need not include all of the illustrated steps.

In step 901, analysis platform 309 may capture, via one or more sensors, a plurality of images of the caliper with the plurality of markers. For example, tips 107 and 109 of caliper 100 may contact surfaces on the opposite sides of a component of machine 200. Visual sensors, e.g., cameras, of UE 301 may capture video or a plurality of images caliper 100. UE 301 may transmit, e.g., in real-time or near real-time, the captured video or a plurality of images, via communication network 307, to analysis platform 309. In some embodiments, the analysis platform 309 may be at least partially implemented on the UE 301. In some embodiments, the analysis platform 309 may be in communication with the UE 301, e.g., by a network 870 or the like.

In step 903, analysis platform 309 may process, via one or more processors, the one or more images of the caliper with the plurality of markers to determine the locations of the plurality of markers. For example, analysis platform 309 may implement various computer vision algorithms, machine learning algorithms, and/or deep learning algorithms to process and analyze the received plurality of images of caliper 100 to recognize the pixels of the images that correspond to the visible feature, e.g., location of the markers of caliper 100.

In step 905, analysis platform 309 may process, via one or more processors, the locations of the plurality of markers to determine a distance between a first tip of the first measuring arm and a second tip of the second measuring arm. Analysis platform 309, via one or more processors, may implement various equations to calculate the distance between tips 107 and 109 based, at least in part, on the known distance between the markers, angle formed by the measuring arms, a plurality of arcs in-between the known distance, or a combination thereof (e.g., as discussed in detail in FIGS. 3-7).

In one instance, analysis platform 309 may determine an operating characteristic of the component, e.g., the wear percentage of the component, by comparing the distance between the first tip and the second tip to reference measurements. Analysis platform 309 may compare the calculated distance between tips 107 and 109 to a pre-determined operating criterion, safety threshold, a minimum thickness threshold, a minimum wear percentage threshold, or a combination thereof. For example, analysis platform 309 may determine a low wear percentage upon determining the distance between the first tip and the second tip satisfies a pre-determined operating criterion. Analysis platform 309 may also determine a high wear percentage upon determining the distance between the first tip and the second tip is below a pre-determined operating criterion.

In one instance, analysis platform 309 may generate a notification in a user interface of a device based, at least in part, on the determined measurement and/or the determined operating characteristic of the component. In one instance, analysis platform 309 may generate, e.g., in real-time or near real-time, a notification in a user interface of UE 301 to alert the user to replace the component. In another instance, analysis platform 309 may generate a notification in a user interface of UE 301 to alert the user that the component is safe for usage. The notification may include measurement information, metadata associated with the measurement information, wear percentage, the usage amount of the component as a percentage of its total estimated life, etc. (as discussed in detail in FIGS. 6 and 7).

In such a manner, system 300 may aid in the prevention of productivity losses when a component is not repaired/replaced or is repaired/replaced too early by providing an accurate wear percentage estimate of the component. One or more embodiments of this disclosure may facilitate efficient use of the component by determining safety and/or maintenance requirements, thereby aiding in the prevention of potential damage to other parts of the machine that depends on the component. This may result in an improved user experience and decreased costs, e.g., inspection costs, repair and maintenance costs, etc.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A system for determining a dimension of a component of a machine, comprising:
   a caliper including:
   a first measuring arm having a first tip;
   a second measuring arm connected to the first arm via a pivot point, and having a second tip; and
   a plurality of markers that includes a respective marker on each of the first measuring arm, the second measuring arm, and the pivot point; and
   a mobile device, including:
   one or more sensors configured to capture an image or a video;
   at least one memory storing instructions; and
   one or more processors operatively connected with the one or more sensors and the at least one memory, and configured to execute the instructions to perform operations, including:
   capturing, via the one or more sensors, one or more images, one or more videos, or a combination thereof of the caliper with the plurality of markers;
   processing the one or more images, the one or more videos, or a combination thereof of the caliper with the plurality of markers to determine locations of the plurality of markers; and
   processing the locations of the plurality of markers to determine a distance between the first tip of the first measuring arm and the second tip of the second measuring arm.

2. The system of claim 1, wherein determining the distance between the first tip and the second tip, further includes:
   determining based on a pre-defined distance between the locations of the plurality of markers, an angle formed at the pivot point by the first measuring arm and the second measuring arm, and one or more arcs formed in-between the pre-defined distance.

3. The system of claim 2, wherein the first measuring arm and the second measuring arm rotate around the pivot point to form the angle and the plurality of arcs.

4. The system of claim 2, wherein the operations further include:
   comparing, via the one or more processors, the distance between the first tip and the second tip to one or more reference measurements, wherein the one or more reference measurements include past measurement data, past maintenance data, past usage data, or a combination thereof pertaining to the component.

5. The system of claim 4, wherein the operations further include:
   determining whether the distance between the first tip and the second tip satisfies a pre-determined safety threshold, a minimum thickness threshold, a minimum wear percentage threshold, or a combination thereof; and
   in response to the determining, selectively:
   generating a first notification in a user interface of the mobile device indicating the component is in an operable condition in response to the distance between the first tip and the second tip satisfying the pre-determined safety threshold, the minimum thickness threshold, the minimum wear percentage threshold, or a combination thereof; or
   generating a second notification in the user interface of the mobile device indicating the component is not in an operable condition in response to the distance between the first tip and the second tip not satisfying the pre-determined safety threshold, the minimum thickness threshold, the minimum wear percentage threshold, or a combination thereof.

6. The system of claim 5, wherein the operations are performed in real-time or near real-time.

7. The system of claim 1, wherein capturing the one or more images, the one or more videos, or a combination thereof of the caliper, further comprising:
   generating, via the one or more processors, a presentation of the caliper in a user interface of the mobile device, wherein the presentation include one or more notifications based, at least in part, on orientation sensors, tilt sensors, inclinometer data, or a combination thereof to align the mobile device.

8. The system of claim 1, wherein the first tip is configured to contact a first surface of the component and the second tip is configured to contact a second surface of the component, and wherein the first surface and the second surface are on opposite sides of the component.

9. The system of claim 1, wherein the operations further include:
   tracking usage data of the component in real-time or near real-time;
   comparing the usage data to the distance between the first tip and the second tip to determine an estimated usage life of the component; and
   generating a notification in a user interface of the mobile device upon determining the usage data exceeds a threshold percentage of the estimated usage life of the component.

10. The system of claim 1, wherein the distance between the first tip and the second tip indicate thickness of the component.

11. A computer-implemented method for determining a dimension of a component of a machine, comprising:
applying a caliper having a plurality of markers on a first measuring arm, a second measuring arm, and a pivot point to the component to be measured;
capturing, via one or more sensors of a mobile device, one or more images, one or more videos, or a combination thereof of the caliper with the plurality of markers;
processing, via one or more processors of the mobile device, the one or more images, the one or more videos, or a combination thereof of the caliper with the plurality of markers to determine locations of the plurality of markers; and
processing, via the one or more processors of the mobile device, the locations of the plurality of markers to determine a distance between a first tip of the first measuring arm and a second tip of the second measuring arm.

12. The computer-implemented method of claim 11, wherein determining the distance between the first tip and the second tip, further includes:
determining based on a pre-defined distance between the locations of the plurality of markers, an angle formed at the pivot point by the first measuring arm and the second measuring arm, and one or more arcs formed in-between the pre-defined distance.

13. The computer-implemented method of claim 12, wherein the first measuring arm and the second measuring arm rotate around the pivot point to form the angle and the plurality of arcs.

14. The computer-implemented method of claim 12, further comprising:
comparing, via the one or more processors, the distance between the first tip and the second tip to one or more reference measurements, wherein the one or more reference measurements include past measurement data, past maintenance data, past usage data, or a combination thereof pertaining to the component.

15. The computer-implemented method of claim 14, further comprising:
determining whether the distance between the first tip and the second tip satisfies a pre-determined safety threshold, a minimum thickness threshold, a minimum wear percentage threshold, or a combination thereof; and
in response to the determining, selectively:
generating a first notification in a user interface of the mobile device indicating the component is in an operable condition in response to the distance between the first tip and the second tip satisfying the pre-determined safety threshold, the minimum thickness threshold, the minimum wear percentage threshold, or a combination thereof; or
generating a second notification in the user interface of the mobile device indicating the component is not in an operable condition in response to the distance between the first tip and the second tip not satisfying the pre-determined safety threshold, the minimum thickness threshold, the minimum wear percentage threshold, or a combination thereof.

16. The computer-implemented method of claim 15, wherein the operations are performed in real-time or near real-time.

17. The computer-implemented method of claim 11, wherein capturing the one or more images, the one or more videos, or a combination thereof of the caliper, further comprising:
generating, via the one or more processors, a presentation of the caliper in a user interface of the mobile device, wherein the presentation include one or more notifications based, at least in part, on orientation sensors, tilt sensors, inclinometer data, or a combination thereof to align the mobile device.

18. A method for determining a dimension of a component, comprising:
receiving one or more images, one or more videos, or a combination thereof of a caliper having a plurality of markers, the one or more images, the one or more videos, or a combination thereof captured by one or more image sensors of a mobile device, the plurality of markers including a respective marker on each of a first measuring arm, a second measuring arm, and a pivot point of the caliper;
processing, via one or more processors, the one or more images, the one or more videos, or a combination thereof of the caliper with the plurality of markers to determine locations of the plurality of markers; and
processing, via the one or more processors, the locations of the plurality of markers to determine a distance between a first tip of the first measuring arm and a second tip of the second measuring arm.

19. The method of claim 18, wherein determining the distance between the first tip and the second tip, further includes:
determining based on a pre-defined distance between the locations of the plurality of markers, an angle formed at the pivot point by the first measuring arm and the second measuring arm, and one or more arcs formed in-between the pre-defined distance.

20. The method of claim 18, further comprising:
comparing, via the one or more processors, the distance between the first tip and the second tip to one or more reference measurements, wherein the one or more reference measurements include past measurement data, past maintenance data, past usage data, or a combination thereof pertaining to the component;
determining whether the distance between the first tip and the second tip satisfies a pre-determined safety threshold, a minimum thickness threshold, a minimum wear percentage threshold, or a combination thereof;
in response to the determining, selectively:
generating a first notification in a user interface of the mobile device indicating the component is in an operable condition in response to the distance between the first tip and the second tip satisfying the pre-determined safety threshold, the minimum thickness threshold, the minimum wear percentage threshold, or a combination thereof; or
generating a second notification in the user interface of the mobile device indicating the component is not in an operable condition in response to the distance between the first tip and the second tip not satisfying the pre-determined safety threshold, the minimum thickness threshold, the minimum wear percentage threshold, or a combination thereof.

* * * * *